(12) United States Patent
Arnason

(10) Patent No.: US 10,143,208 B2
(45) Date of Patent: Dec. 4, 2018

(54) IN-FEEDING AND OBJECT RELEASE APPARATUS

(71) Applicant: SKAGINN HF., Akranes (IS)

(72) Inventor: Ingolfur Arnason, Akranes (IS)

(73) Assignee: SKAGGIN HF, Akranes (IS)

( * ) Notice: Subject to any disclaimer, the term of this patent is extended or adjusted under 35 U.S.C. 154(b) by 0 days.

(21) Appl. No.: 15/553,827

(22) PCT Filed: Feb. 26, 2016

(86) PCT No.: PCT/IS2016/050004
§ 371 (c)(1),
(2) Date: Aug. 25, 2017

(87) PCT Pub. No.: WO2016/135757
PCT Pub. Date: Sep. 1, 2016

(65) Prior Publication Data
US 2018/0035684 A1    Feb. 8, 2018

(30) Foreign Application Priority Data
Feb. 26, 2015  (IS) .......................................... 050102

(51) Int. Cl.
| | |
|---|---|
| *A22C 25/08* | (2006.01) |
| *A22C 25/06* | (2006.01) |
| *A22C 25/04* | (2006.01) |
| *B65G 15/14* | (2006.01) |
| *B65G 15/50* | (2006.01) |
| *B65G 47/82* | (2006.01) |
| *B65G 15/12* | (2006.01) |

(Continued)

(52) U.S. Cl.
CPC .............. *A22C 25/08* (2013.01); *A22C 25/04* (2013.01); *A22C 25/06* (2013.01); *B23Q 7/06* (2013.01); *B65G 15/12* (2013.01); *B65G 15/14* (2013.01); *B65G 15/50* (2013.01); *B65G 47/82* (2013.01); *B65G 47/1478* (2013.01); *B65G 2201/0202* (2013.01); *B65G 2203/042* (2013.01)

(58) Field of Classification Search
CPC .......... A22C 25/04; A22C 25/06; A22C 25/08
See application file for complete search history.

(56) References Cited

U.S. PATENT DOCUMENTS 3,895,479 A * 7/1975 Kastner ................... B65B 19/34
                                                            53/148
3,913,643 A * 10/1975 Lambert ................... B23Q 7/06
                                                            144/162.1

(Continued)

FOREIGN PATENT DOCUMENTS

| EP | 0548383 A1 | 6/1993 |
| GB | 1495482 A | 12/1977 |

(Continued)

*Primary Examiner* — Thomas Randazzo
(74) *Attorney, Agent, or Firm* — Muncy, Geissler, Olds & Lowe, P.C.

(57) ABSTRACT

The present invention relates to a method and a device for individual feeding of fish into a processing line. Such method and device may, for instance, be used for receiving, gilling and gutting freshly caught fish in a processing line on board a fishing vessel. For instance, the in-feeding apparatus and method may be used to increase the value of the fish by speeding up the time until the fish is chilled for storing.

17 Claims, 2 Drawing Sheets

(51) Int. Cl.
  *B23Q 7/06*   (2006.01)
  *B65G 47/14*  (2006.01)

(56) References Cited

U.S. PATENT DOCUMENTS

| | | | | |
|---|---|---|---|---|
| 5,291,983 | A * | 3/1994 | Pegoraro | A22C 25/12 198/399 |
| 5,582,283 | A * | 12/1996 | Arnarson | B65G 43/08 198/357 |
| 5,702,295 | A * | 12/1997 | Ketels | A22C 25/08 452/180 |
| 5,871,078 | A * | 2/1999 | Arnarson | B65G 43/08 198/358 |
| 7,252,584 | B2 * | 8/2007 | Kragh | A22C 25/08 452/163 |
| 2005/0120848 | A1 * | 6/2005 | Nielsen | A22C 21/0053 83/423 |
| 2006/0154587 | A1 | 7/2006 | Mikkelsen et al. | |
| 2007/0068772 | A1 | 3/2007 | Bahr | |

FOREIGN PATENT DOCUMENTS

| | | |
|---|---|---|
| GB | 1540686 A | 2/1979 |
| WO | WO 95/031391 A1 | 11/1995 |
| WO | WO 02/069722 A1 | 9/2002 |
| WO | WO 03/009237 A1 | 1/2003 |
| WO | WO 2014/174535 | 10/2014 |

* cited by examiner

IN-FEEDING AND OBJECT RELEASE APPARATUS

FIELD OF THE INVENTION

The invention relates to a method and a device for individual feeding of fish into a processing line. Such method and device may, for instance, be used for receiving, gilling and gutting freshly caught fish in a processing line on board a fishing vessel. For instance, the in-feeding apparatus and method may be used to increase the value of the fish by speeding up the time until the fish is chilled for storing.

BACKGROUND

A continuous development of food processing, such as processing of fish products is always on demand with the focus on for instance to increase utilization and value of products as well as meeting demands for quality after processing. When handling a large quantity of fresh food products, speed is of major importance.

In many cases the processing is done on land, which requires storing the fish at sea and during transport to the factory. In this case the time period from when a caught fish ends up on the deck of fishing ship and to the time the fish starts cooling process needs to be as short as possible as all handling and transport has effect on the quality of the fish.

WO 2014/174535 provides an improved method where whole fish is brought to an under-cooled state by superchilling before processing. Freshly caught fish is gilled and gutted at a workstation and then each fish is individually transported to a screw blade tank filled with sea water to facilitate the bleeding of the fish and to prevent the meet to be coloured by the blood. During transport to the bleeding tank the fish passes image means to determine the size of the fish. In this manner the fish can be directed into three different lanes for rinsing and subsequently cooling to bring the fish to an undercooled state by a stepwise cooling process.

U.S. Pat. No. 5,702,295 discloses an apparatus for automatically positioning fish with respect to their plane of symmetry and for the periodic transfer of the fish to a fish processing machine is proposed. The apparatus uses a supply conveyor in the form of a trough conveyor and a feed conveyor arranged below and perpendicular to the supply conveyor for feeding the fish into a processing machine. The feed conveyor includes a support conveyor with support elements onto which each fish is placed where the support elements protrude into the belly cavity. This is achieved by a holding element which is arranged between the supply conveyor and the feed conveyor and is controlled by a signal to open and release the temporarily held fish.

In order to efficiently pre-process, such as bleeding and gutting whole fish, and sorting fish prior to cooling it for storage until it is processed in factories on land, a large amount of fish needs to be handled in a short time to preserve freshness and quality of the fish. One of the drawbacks of pre-processing and delivering individual fish onto a processing line in a time efficient manner is the management of a time-efficient in-feeding mechanism and in some instances a horizontal drop of the fish onto the next apparatus of a processing line.

SUMMARY OF THE INVENTION

It is an object of the present invention to overcome and/or ameliorate the aforementioned drawbacks of the prior art and to provide an improved and/or alternative and/or additional method or device for feeding fish after slaughtering and/or gutting and/or gilling into a processing line. It is one preferred object of the present invention to provide a device in order to facilitate individual in-feeding of fish into a processing line in a continuous manner reducing gaps in the processing line. Moreover, it is a preferred object of the present invention to provide a fast method and device, preferably designed as a conveyor device to transport fish from a slaughtering and/or gutting station to a conveyor which facilitates bleeding of fish where a horizontal drop of each fish from the in-feeding apparatus may be desired. Another preferred object of the present invention is to provide a device having a design where a fish is transported as a single item from a slaughtering and/or gutting station to bleeding apparatus. It is also a preferred object of the present invention to provide a device with an improved operability and/or an increased ease of use during operation of the device.

The object(s) underlying the present invention is (are) particularly solved by the features defined in the independent claims. The dependent claims relate to preferred embodiments of the present invention. Further additional and/or alternative aspects are discussed below.

Thus, at least one of the preferred objects of the present invention is solved by an apparatus for feeding objects to a process line. Preferably the apparatus comprises one or more object receivers having a sensing means for sensing an object in the object receiver and releasing means for releasing objects from the object receiver. Preferably the apparatus also comprises a V-shaped conveyor for feeding the objects said to a process line. Preferably the V-shaped conveyor comprises two individual continuous conveyor belts and slide resisting means on the surface of the two individual continuous conveyor belts. Preferably, one of the two belts forming the v-shaped conveyor is longer than the other belt at the out feed end of the belt. The apparatus further comprises computing means for determining item spaces on the belt and determine the time for the releasing mechanism to eject the object onto designated object space on the v-shaped conveyor. Preferably the apparatus provides the ability to feed objects from the apparatus to a process line, one object at the time, at high speed. In order to give such fast performance, the computing means divides the V-shaped belt into object spaces and as soon as an object space is free it assigns an object in a object receiver to that object space. When the assigned object space is in line with the object receiver holding the object assigned to that particular object space, the releasing mechanism ejects the object out of the object receiver and onto the v-shaped belt.

Another preferred object of the present invention is solved by a method for feeding objects to a process line. Preferably the method comprises the steps of feeding a objects in an object receiver, detecting the object by a sensing means in object receiver, determining an object space on a v-shaped conveyor consisting of two individual continuous conveyor belts by a computing means, releasing the object from the object receiver by a releasing means onto the v-shaped conveyor, the conveyor belts of said v-shaped conveyor further comprising slide resisting means on the surface of the belt to prevent the object from sliding as they are released onto a moving v-shaped conveyor belt, and releasing the objects from the v-shaped conveyor by dropping the object from the out-feed end by means of one of the two belts forming the v-shaped conveyor.

The device is preferably designed to use in combination with a processing line, where each fish is handled individually from the time it is first picked up by a worker on an in-feeding mechanism and slaughtered or gilled. The problems to be solved in such a system is the combination of an individual handling of each fish until it has been batched for storing and to do it at a speed fast enough to maintain the best quality of the fish. Therefore, the combination of an object receiver with an ejection mechanism, a v-shaped conveyor belt with a slide resisting surface and an out-feed end of the v-shaped conveyor belt with a one of the belts being longer than the other in combination with sensors and imaginary object spaces on the v-shaped belt determined by the computer provides the solution of a fast in-feeding system where each fish is handled individually and delivered onto the next mechanism in the processing line with a horizontal drop.

An object receiver could be understood as a chamber for holding an object until it is ready to be ejected onto a moving conveyor. Preferably, the object receiver is provided with an ejection mechanism for quick release from the chamber and onto the next step in the processing line.

The term "sensing means" is to be understood as a sensor for detecting the presence of an object in the object receiver or on a conveyor belt.

The term "slide resisting means" as a part of a conveyor belt is to be understood as the material at the surface of belt itself is such material that objects do not slide when they are dropped or ejected onto the belt, particularly when the belt is in motion. As an object such as fish is dropped onto a moving conveyor the fish may slide on the belt when it lands. In order to maintain a fast method and provide such fast apparatus with imaginary object spaces on the belt it is important that the objects maintain the position they are dropped onto although the belt is moving. Therefore this term relates to clammy, sticky, and rubbery or non-slip material to prevent objects such as fish to slide on the belt when they are ejected onto the belt and to pull the items off the belt with the longer belt at the out-feed end.

The term "object space" is to be understood as an imaginary slot on a conveyor belt. A conveyor belt that is not divided by physical barriers such as cleats or the kind, can be divided by means of a computer and sensors into imaginary spaces to fit an object.

Accordingly, the set-up of the in-feeding apparatus may involve a plurality of workstations with an object receiver for each work station. Preferably the number of workstations is sufficient to be constantly feeding where the v-shaped belt to minimize the number of free object spaces on the v-shaped at any given time.

Preferably, the apparatus and the method of the present invention provides a high speed method of feeding fish onto a process line, where each fish is processed individually and is characterized and batched into batches as single fish.

The method and the apparatus is preferably adapted to facilitate in-feeding of single whole fish onto a processing line after pre-processing on a fishing ship or at a site near fish farm where farmed fish is being slaughtered. The fish is brought out of water to workstations, where the fish is gutted and/or gilled. Preferably, a worker at a workstation receives the fish from an in-feeding mechanism and after the worker has finished processing the fish, such as gilling and/or gutting or bleeding the fish the worker releases the fish into an object receiver. Preferably the access to the object receiver is simple and fast. The object receiver is preferably a chamber below the work station. Preferably the object receiver has a sensor above or in one of the sides of the chamber to detect the presence of a fish being placed in the object receiver by the worker. The object receiver is implemented with a releasing mechanism for releasing objects from the object receiver. Preferably, the bottom of the chamber is a plate and a piston behind the plate pushes the plate and thereby the object out of the chamber and onto a v-shaped conveyor belt. The v-shaped conveyor consists of two individual continuous conveyor belts. Preferably the two individual continuous conveyor belts of the v-shaped conveyor have slide resisting means on the surface of the belts. The material of the belt itself or used as a surface layer is preferably, clammy, sticky, rubbery or non-slip material. The slide-resisting material implemented on the surface or the surface is used in order for the determined item space on the moving belt to catch the fish as it is released onto the belt and carry the fish away from the object receiver without the fish sliding over to other item spaces. A computer calculates and determines empty and full item spaces on the v-shaped conveyor belt. Therefore, when a fish has been released onto an object receiver, it is kept there until the computer has assigned the next free object space on the v-shaped conveyor belt to the fish and when that free space is positioned below the object receiver the object is released from the object receiver and onto the belt. Preferably the mechanism implemented to take away each fish from the in-feeding belt is positioned below the out-feed end of the v-shaped belt. As one of the two belts forming the v-shaped conveyor may be provided as longer than the other belt at the out feed end of the belt, the longer belt with the non-slip surface pulls the fish off the V-shaped belt and may facilitate a substantially horizontal drop of the fish from the in-feed device and onto the take-away mechanism.

Preferably the in-feeding apparatus of the present invention is positioned next to a take-away conveyor belt to facilitate bleeding of the fish. Preferably a plurality of workers are positioned at an equal number of workstations. When the worker has finished processing the fish, such as gilling and/or gutting or bleeding the fish the worker releases the object into an object receiver. A continuous transport and distribution conveyor is implemented for transporting objects to workstations and between the workstations. Preferably the continuous transport and distribution conveyor consists of two belts running in opposite directions and diverting means divert the items between the conveyor belts for circulating the fish until a worker picks up a fish for processing. The v-shaped conveyor belt is positioned under the continuous transport and distribution conveyor.

All embodiments listed below relate to both the apparatus and the method of the present invention.

In one preferred embodiment the v-shaped conveyor, comprising two individual continuous conveyor belts, comprises two endless flank conveyors being arranged in a V-shape and running synchronously in an outfeed direction to feed the objects further in a processing line. The flank conveyors comprise slide resisting means or gripping active surfaces having gripping properties on the surface of the two individual continuous conveyor belts in the direction of movement.

In one preferred embodiment one of the two belts forming the v-shaped conveyor is longer than the other belt at the out feed end of the belt.

In one preferred embodiment the apparatus further comprises one or more working stations.

In one preferred embodiment the apparatus further comprises a continuous conveyor for transporting objects to workstations.

In one preferred embodiment the object receiver is positioned below each of the one or more workstations.

In one preferred embodiment the object is whole fish.

In one preferred embodiment the objects are feed from the apparatus to a process line, one object at the time, preferably at high speed.

In one preferred embodiment the objects are pre-processed at one or more working stations. Such pre-processing step refers to one or more, but is not limited to, sorting, slaughtering, gilling, gutting whole fish.

In one preferred embodiment the worker releases the object into the object receiver, which is positioned below each of the one or more workstations.

In one preferred embodiment the computing means assigns a next free object space to the nearest object in an object receiver.

In one preferred embodiment the computing means calculates and assigns free object spaces to items in the one or more workstations to minimize the number of free object spaces at any time on the v-shaped conveyor belt.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Figure 1:
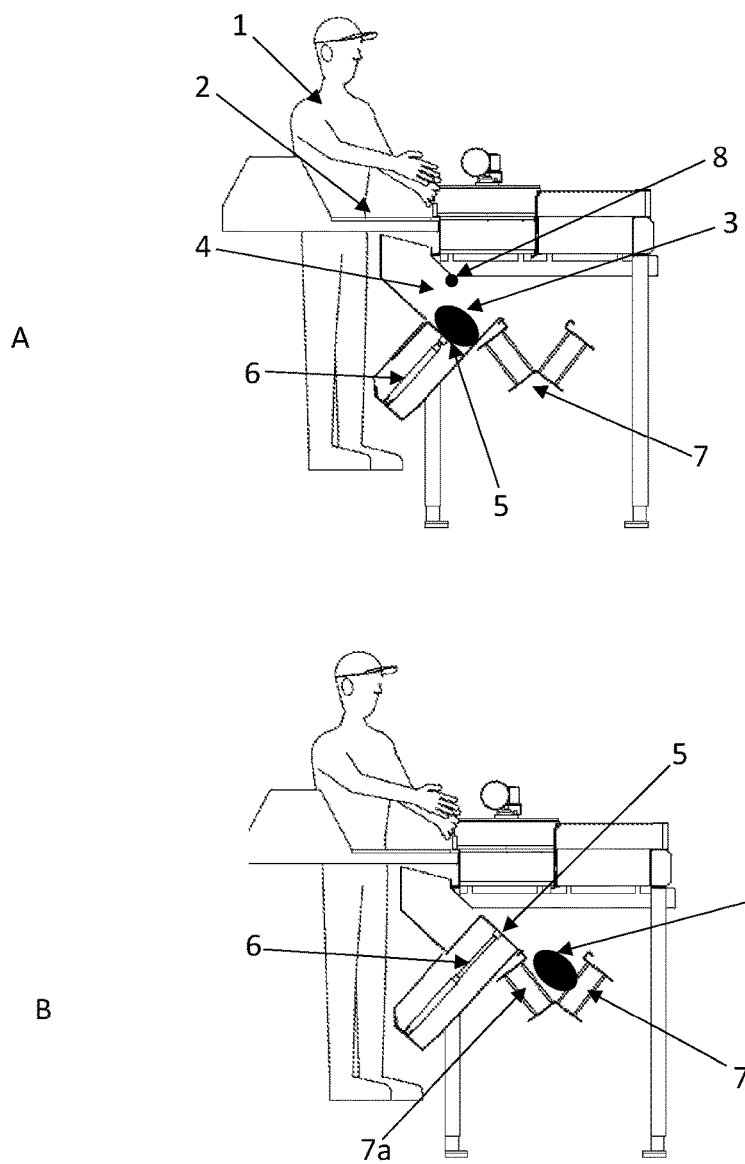
FIG. 1 is a side view and a cross section of the apparatus of the present invention.

FIG. 1 shows a side view and a cross section of the apparatus of the present invention. It is an apparatus for feeding objects such as fish onto to a process line. The figure shows an embodiment of a worker 1 at a workstation 2. When the worker 1 has finished processing the fish 3, such as gilling and/or gutting the fish the worker releases the object into an object receiver 4. The object receiver is a chamber below the work station and it has a sensor 8 above or in one of the sides of the chamber to detect the presence of an object/fish being placed in the object receiver by the worker 1. In FIG. 1A, an object/fish 3 is shown on the workstation 2 and in the object receiver 4. The object receiver further comprises a releasing means for releasing objects from the object receiver. In the embodiment shown in FIG. 1, the bottom of the chamber is a plate 5 and a piston 6 behind the plate 5 pushes the plate and thereby the object out of the chamber and onto a v-shaped conveyor belt 7. In FIG. 1B, the object has been released from the object receiver 4 and onto the v-shaped conveyor belt 7. The v-shaped conveyor consists of two individual continuous conveyor belts 7a and 7b. The two individual continuous conveyor belts of the v-shaped conveyor 7 have slide resisting means on the surface of the belts. This is a rough material implemented on the surface or the surface is made from such a material in order for the determined item space on the moving belt to catch the fish as it is released onto the belt and carry the fish away from the object receiver without the fish sliding over to other item spaces. One of the two belts forming the v-shaped conveyor is longer than the other belt at the out feed end of the belt (not shown in the drawing). A computer calculates and determines empty and full item spaces on the v-shaped conveyor belt. Therefore, when a fish has been released onto an object receiver, it is kept there until the computer has assigned the next free object space on the v-shaped conveyor belt to the fish and when that free space is positioned below the object receiver the object is released from the object receiver and onto the belt.

Figure 2:
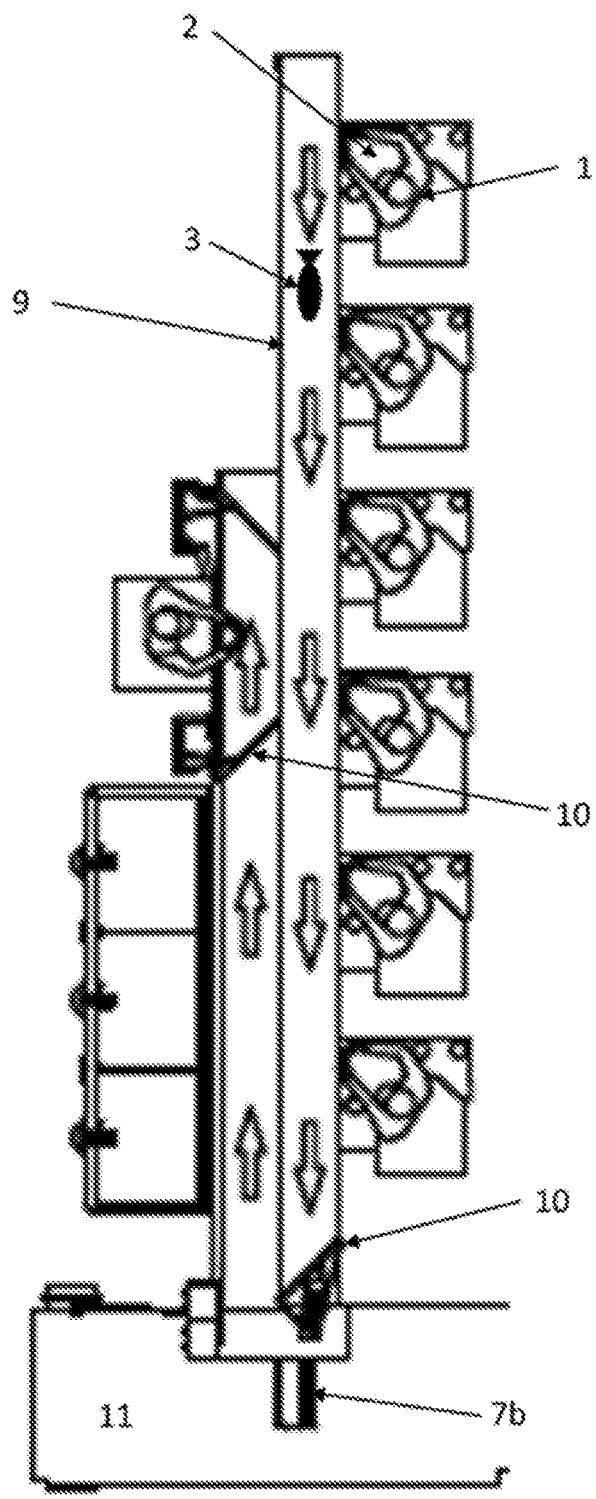
FIG. 2 is a top view of the apparatus of the present invention.

FIG. 2 shows a top view of the apparatus of the present invention. The figure shows an embodiment of workers 1 at seven workstations 2. When the worker 1 has finished processing the fish 3, such as gilling and/or gutting the fish the worker releases the object into an object receiver (not shown in the drawing). The object receiver is a chamber below the work station and it has a sensor (not shown in the drawing). A continuous transport and distribution conveyor 9 is implemented for transporting objects to workstations is shown consisting of two belts running in opposite directions. The arrows indicate the direction of transport and diverting means 10 divert the items between the conveyor belts for circulating the fish until a worker 1 picks up a fish for processing. The v-shaped conveyor belt 7 is positioned under the continuous transport and distribution conveyor 10 and only the longer belt 7b of the v-shaped conveyor belt 7 is shown at the out-feed end of the belt extending over the take-away conveyor belt 11.

The invention claimed is:

1. An apparatus for feeding objects to a process line, the apparatus comprising:
   an object receiver, said object receiver being a chamber and comprising:
      sensing means in the object receiver, and
      releasing means for releasing objects from the object receiver;
   a V-shaped conveyor, said V-shaped conveyor comprising:
      two individual continuous conveyor belts; and
      slide resisting means on a surface of the two individual continuous conveyor belts; and
   computing means for determining item spaces on the continuous conveyor belts,
   wherein the computing means divides the V-shaped conveyor into a plurality of object spaces and when an object space of the plurality of object spaces is free the computing means assigns an object in the object receiver to the object space.

2. The apparatus according to claim 1, wherein one of the two individual continuous conveyor belts forming the V-shaped conveyor is longer than the other belt at an outfeed end of the V-shaped conveyor.

3. The apparatus according to claim 1, wherein the object receiver has a sensor above or in a side of the chamber.

4. The apparatus according to claim 1, further comprising one or more working stations.

5. The apparatus according to claim 4, further comprising a continuous conveyor for transporting objects to the one or more workstations.

6. The apparatus according to claim 4, wherein the object receiver is positioned below each of the one or more workstations.

7. The apparatus according to claim 4, wherein the one or more workstations comprises an opening or release means to release the object into the object receiver.

8. The apparatus according to claim 4, wherein the object receiver has a bottom plate and a piston to push the bottom plate to an outfeed end of the chamber.

9. A method for feeding objects to a process line, the method comprising:
   feeding objects in an object receiver;
   detecting the objects by a sensing means in the object receiver;

determining an object space on a v-shaped conveyor consisting of two individual continuous conveyor belts by a computing means;

when the object space is free, the computing means assigning an object in the object receiver to the object space;

releasing the object from the object receiver by a releasing means onto the v-shaped conveyor, the two individual continuous conveyor belts of said v-shaped conveyor further comprising slide resisting means on a surface of the two individual continuous conveyor belts to prevent the object from sliding as the object is released onto the v-shaped conveyor;

releasing the objects from the v-shaped conveyor by dropping the object from the outfeed end; and feeding the objects from the apparatus to a process line, one object at the time.

10. The method according to claim 9, wherein said releasing the objects from the v-shaped conveyor comprises dropping the object in a relatively horizontal position from the outfeed end by one of the two individual continuous conveyor belts forming the v-shaped conveyor being longer than the other belt.

11. The method according to claim 9, wherein a sensor above or in one of the sides of the object receiver detects presence of a fish being placed in the object receiver by the worker.

12. The method according to claim 9, wherein the object is whole fish.

13. The method according to claim 9, wherein the computing means assigns a next free object space to a nearest object in an object receiver.

14. The method according to claim 13, wherein the computing means calculates and assigns free object spaces to items in the one or more workstations to minimize the number of free object spaces at any time on the v-shaped conveyor belt.

15. The method according to claim 9, further comprising pre-processing objects at one or more working stations.

16. The method according to claim 15, further comprising a worker releasing the object into the object receiver, said object receiver is positioned below each of the one or more workstations.

17. The method according to claim 15, wherein said pre-processing comprises one or more of sorting, slaughtering, gilling, and gutting whole fish.

* * * * *

UNITED STATES PATENT AND TRADEMARK OFFICE
CERTIFICATE OF CORRECTION

| | | |
|---|---|---|
| PATENT NO. | : 10,143,208 B2 | Page 1 of 1 |
| APPLICATION NO. | : 15/553827 | |
| DATED | : December 4, 2018 | |
| INVENTOR(S) | : Amason | |

It is certified that error appears in the above-identified patent and that said Letters Patent is hereby corrected as shown below:

On the Title Page

At Item (73), Assignee:
Delete "SKAGGIN HF,"
And insert --SKAGINN HF,--

Signed and Sealed this
Seventh Day of January, 2020

Andrei Iancu
*Director of the United States Patent and Trademark Office*